(12) United States Patent
Berry et al.

(10) Patent No.: US 11,985,124 B2
(45) Date of Patent: May 14, 2024

(54) SYSTEM FOR IMPLEMENTING MULTIFACTOR AUTHENTICATION BASED ON SECURE TOKENIZATION

(71) Applicant: BANK OF AMERICA CORPORATION, Charlotte, NC (US)

(72) Inventors: Anna Kristen Pingel Berry, Indian Land, SC (US); Shweta Ambulkar, Plainsboro, NJ (US); Benjamin Daniel Hardman, Harrisburg, NC (US); Angela Ianni, Lincoln, RI (US); Olga Kocharyan, Matthews, NC (US); Luqman Sharief, Libertyville, IL (US); Michael Wm. Whitaker, Fort Worth, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 216 days.

(21) Appl. No.: 17/830,673

(22) Filed: Jun. 2, 2022

(65) Prior Publication Data
US 2023/0396610 A1 Dec. 7, 2023

(51) Int. Cl.
*H04L 9/40* (2022.01)
(52) U.S. Cl.
CPC ................. *H04L 63/0853* (2013.01)
(58) Field of Classification Search
CPC .................................................. H04L 63/0853
See application file for complete search history.

(56) References Cited

U.S. PATENT DOCUMENTS

| | | | |
|---|---|---|---|
| 8,321,678 B2 | 11/2012 | Hofmann et al. | |
| 8,689,290 B2 | 4/2014 | Buer | |
| 8,707,029 B2 | 4/2014 | Brand et al. | |
| 8,756,423 B2 | 6/2014 | Djordjevic et al. | |
| 8,862,872 B2 | 10/2014 | Vanderveen et al. | |
| 8,898,453 B2 | 11/2014 | Preiss et al. | |
| 8,913,995 B2 | 12/2014 | Vanderveen et al. | |
| 9,071,963 B2 | 6/2015 | Khan et al. | |
| 9,270,663 B1 | 2/2016 | Kravitz et al. | |
| 9,521,548 B2 | 12/2016 | Fosmark et al. | |
| 9,578,025 B2 | 2/2017 | Pinski et al. | |
| 10,771,263 B2 | 9/2020 | Smith et al. | |
| 10,817,875 B2 | 10/2020 | Makhotin et al. | |
| 11,188,901 B2 | 11/2021 | Karpenko et al. | |
| 11,308,487 B1 * | 4/2022 | Foster | G06Q 20/3829 |

(Continued)

*Primary Examiner* — Nelson S. Giddins
(74) *Attorney, Agent, or Firm* — Moore & Van Allen PLLC; James C. Edwards

(57) ABSTRACT

Leveraging secure tokenization, such as a Non-Fungible Token (NFT), for purposes of multifactor and/or elevated user authentication. In this regard, an authentication NFT is generated based at least on a user's authentication credentials. Subsequently, the authentication NFT is verified/validated via a private distributed trust computing network and stored, in a deactivated state, on a distributed ledger. Once the user is confronted with an elevated and/or multifactored authentication process, the user may initiates use of the authentication NFT by checking-out the authentication NFT from the distributed ledger and moving the authentication NFT from the deactivated state to an activated state, in which the user credentials are accessible to the user for purposes of authentication.

20 Claims, 9 Drawing Sheets

(56) References Cited

U.S. PATENT DOCUMENTS

| | | | |
|---|---|---|---|
| 11,757,640 B2 * | 9/2023 | Ferenczi | ............... H04L 9/3247 |
| | | | 713/172 |
| 11,907,939 B2 * | 2/2024 | Cramer | .............. G06Q 20/3825 |
| 2010/0010932 A1 | 1/2010 | Law et al. | |
| 2014/0189799 A1 | 7/2014 | Lu | |
| 2017/0163629 A1 | 6/2017 | Law et al. | |
| 2019/0043022 A1 | 2/2019 | Fosmark et al. | |
| 2020/0097948 A1 | 3/2020 | Sheets et al. | |
| 2021/0409956 A1 | 12/2021 | Wagner | |

\* cited by examiner

SYSTEM FOR IMPLEMENTING MULTIFACTOR AUTHENTICATION BASED ON SECURE TOKENIZATION

FIELD OF THE INVENTION

The present invention is related to user authentication and, more specifically, leveraging secure tokenization, such as a Non-Fungible Token (NFT) for purposes of multifactor and/or elevated user authentication.

BACKGROUND

In many instances, presentation of conventional user credentials may not be adequate to ensure that a user authentication process is verifiable. In this regard, merely providing a previously stored password or, some instances, biometric data may not be adequate if the password and/or biometric data has been compromised or if the underlying event requiring user authentication calls for heightened user credentials (i.e., a multifactor authentication process).

Instances in which presentation of conventional user credentials may not be adequate to ensure verifiability of the user authentication process include, but are not limited to, remotely resetting user credentials on a mobile device or otherwise resetting user credentials when other authentication means are inadequate or unavailable, applying for or renewing a an account or a Virtual Private Network (VPN) certificate, providing elevated access rights to data or functionality, initiating a transaction that exceeds a predetermined amount or in which suspicious activity has been detected.

Therefore, a need exists to develop systems, methods and the like that would provide for a highly secure and defensible means for user authentication and, more specifically multifactor and/or elevated user authentication.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by leveraging secure tokenization, such as a Non-Fungible Token (NFT) for purposes of multifactor and/or elevated user authentication. In this regard, an authentication NFT is generated that uses some form of a user's authentication credentials (e.g., KYU/KYC data, biometric data, and the like) as the seed input for the NFT hash algorithm(s). Subsequently, the authentication NFT is verified/validated via a private (i.e., non-public or proprietary) distributed trust computing network and stored therein on in a distributed ledger in an inactive state. In this regard, the authentication NFT is either generated in the inactive state or presented to the user for deactivation prior to presenting the authentication NFT to the private distributed trust computing network for verification/validation and storage.

Once the user desires to use the authentication NFT for purposes of authentication, the deactivated authentication NFT is checked-out from the corresponding distributed ledger of the private distributed trust network and the authentication NFT must be activated in order to use the associated user credentials for purposes of authentication. In specific embodiments of the invention, activation occurs as a result of the user providing a requisite input, such as presenting a passcode, biometric data or the like. In other embodiments of the invention, activation may occur in an automated manner once the user requests access to the authentication NFT. Once activated, the user credentials associated with the authentication NFT are only valid as long as the authentication NFT is in the activated state. In specific embodiments of the invention, activation may include, but is not limited to, decrypting an encryption applied over the top of the authentication NFT (e.g., a key wrapping procedure or the like). The activation period may be time restricted, in that, the authentication NFT may be automatically deactivated and checked back into the corresponding distributed ledger of the private distributed trust network after expiration of a predetermined time period or, in other embodiments of the invention, the user may be tasked with deactivated and checked back into the corresponding distributed ledger of the private distributed trust network.

A system for user authentication defines first embodiments of an invention. The system includes a first computing platform having a first memory and one or more first processing devices in communication with the first memory. The first memory stores an authentication Non-Fungible Token (NFT) generator that is executable by at least one of the one or more first processing devices. The authentication NFT generator is configured to receive one or more user credentials associated with a user and generate an authentication NFT for the user using at least the one or more user credentials as input to the authentication NFT generator (i.e., input to the NFT hash algorithms used to generate the NFT).

The system additionally includes a first private (i.e., non-public or proprietary) distributed trust computing network having a plurality of first decentralized nodes. Each first decentralized node having a second memory and at least one second processing device in communication with the second memory. The second memory of the first decentralized nodes is configured to store one or more first distributed ledgers. Each first distributed ledger having a plurality of first data blocks. In response to receiving the authentication NFT, a plurality of the first decentralized nodes are configured to verify authenticity of the authentication NFT, and, once verified, the authentication NFT is stored, in a deactivated state, as a first data block within one of the one or more first distributed ledgers.

Moreover, the system includes a second computing platform having a third memory and one or more third processing devices in communication with the third memory. The third memory stores an authentication application that is executable by at least one of the one or more third processing devices and configured to, as part of an elevated or multifactor user authentication process and initiated by the user, receive one or more first inputs from the user that are configured to (i) identify a location of the authentication NFT on the first private distributed trust computing network, (ii) check-out the authentication NFT from the first private distributed trust computing network, and (iii) in response to checking-out the authentication NFT from first private distributed trust computing network, provide for the authentication NFT to be moved from the deactivated state to an activated state. Further, in response to moving the authentication NFT to the activated state, the authentication application is further configured to apply the one or more user credentials to authenticate the user.

In specific embodiments of the system, the authentication NFT generator is further configured to generate the authentication NFT in the activated state, and communicate the activated authentication NFT to the user, such that the user provides at least one second input that deactivates the authentication NFT and initiates communication to the first private distributed trust communication network. In alternate embodiments of the system, the authentication NFT generator is further configured to generate the authentication NFT in the deactivated state and communicate the deactivated authentication NFT to the first private distributed trust computing network.

In further specific embodiments of the system, the deactivated state is an encrypted state and the activated state is an unencrypted or decrypted state. In additional specific related embodiments of the system, the encrypted state provides for key wrapping the authentication NFT and the decrypted state proved for unwrapping the key wrapping. In other specific embodiments the system further includes a second private distributed trust computing network. In such embodiments of the system, the authentication application is further configured to provide for the authentication NFT to be moved from the deactivated state to the activated state by communicating the authentication NFT to the second private distributed trust computing network. In response to receiving the authentication NFT, a plurality of the decentralized nodes of the second private distributed trust computing network are configured to verify authenticity of the authentication NFT, and the authentication NFT is stored, in the activated state, as a second data block within one of the one or more second distributed ledgers.

In other specific embodiments of the system, the authentication application is further configured to receive one or more second inputs from the user that are configured to (i) move the authentication NFT from the activated state to the deactivated state, and (ii) check-in the authentication NFT to the first private distributed trust computing network. In alternate specific embodiments of the system, the authentication application is configured to, in response to expiration of a predetermined time period, automatically (i) move the authentication NFT from the activated state to the deactivated state, and (ii) check-in the authentication NFT back to the first private distributed trust computing network.

In additional specific embodiments of the system, the authentication NFT generator is further configured to receive a digital object, such as (i) an image file, (ii) an audio file, or (iii) a multimedia file, and generate the authentication NFT additionally using (i) the image file, (ii) the audio file, or (iii) the multimedia file as input to the authentication NFT generator (i.e., additional input to the NFT hash algorithms used to generate the NFT). In such embodiments of the system, the authentication application may be further configured to present a plurality of (i) image files, (ii) audio files, or (iii) multimedia files, with one of the plurality of (i) image files, (ii) audio files, or (iii) a multimedia files corresponding to (i) the image file, (ii) the audio file, or (iii) the multimedia file used to generate the authentication file. In such embodiments of the system, user selection of the (i) the image file, (ii) the audio file, or (iii) the multimedia file used to generate the authentication file from amongst the plurality of (i) image files, (ii) audio files, or (iii) multimedia files provides for at least one of the one or more first inputs.

Moreover, in additional embodiments of the system, the elevated or multifactored authentication process consists of one of (i) at least one of a user identification and a password reset, (ii) a new account request, (iii) initiation of a resource exchange event that exceeds a predetermined resource exchange amount, (iv) in response to suspicious activity associated with a resource exchange event, (v) request a new or refresh of an existing Virtual Private Network (VPN) certification, and (vi) temporary access to privileged data or functionality within an application or the like.

A computer-implemented method for user authentication defines second embodiments of the invention. The computer-implemented method is executed by one or more computing processor devices. The computer-implemented method includes receiving one or more user credentials associated with a user and generating an authentication NFT) for the user using at least the one or more user credentials as input to an authentication NFT generating algorithm. Additionally, the method includes verifying an authenticity of the authentication NFT through consensus of a plurality of decentralized nodes of a private distributed trust computing network and storing the authentication NFT, in a deactivated state, as a data block within a distributed ledger of the private distributed trust computing network. In response to an elevated or multifactor user authentication process, the method includes receiving one or more inputs from the user that are configured to (i) identify a location of the authentication NFT on the first private distributed trust computing network, (ii) check-out the authentication NFT from the first private distributed trust computing network, and (iii) in response to checking out the authentication NFT from first private distributed trust computing network, provide for the authentication NFT to be moved from the deactivated state to an activated state. In response to moving the authentication NFT to the activated state, the method further includes attempting to authenticate the user using the one or more user credentials used to generate the authentication NFT.

In specific embodiments of the computer-implemented method, generating the authentication Non-Fungible Token (NFT) further includes generating the authentication NFT in the activated state. In such embodiments the computer-implemented method further includes communicating the authentication NFT in the activated state to the user, with the user providing at least one second input that deactivates the authentication NFT and initiates communication to the first private distributed trust communication network.

In other specific embodiments of the computer-implemented method, the deactivated state is an encrypted state and the activated state is an unencrypted or decrypted state.

In still further specific embodiments of the computer-implemented method, receiving one or more inputs from the user that are configured to, in response to checking out the authentication NFT, provide for the authentication NFT to be moved from the deactivated state to an activated state further comprises receiving one or more inputs from the user that are configured to provide for the authentication NFT to be moved from the deactivated state to an activated state by communicating the authentication NFT to a second private distributed trust computing network, and storing the authentication NFT, in the activated state, as a second data block within a second distributed ledger of the second private distributed trust computing network.

Moreover, in additional specific embodiments the computer-implemented method further includes receiving one or more second inputs from the user that are configured to (i) move the authentication NFT from the activated state to the deactivated state, and (ii) check-in the authentication NFT to the first private distributed trust computing network, or, alternatively, in response to expiration of a predetermined time period, automatically (i) moving the authentication NFT from the activated state to the deactivated state, and (ii) checking the authentication NFT back in to the first private distributed trust computing network.

A computer program product including a non-transitory computer-readable medium having sets of codes defines third embodiments of the invention. The sets of codes are configured for causing computing processing device(s) to receive one or more user credentials associated with a user and generate an authentication Non-Fungible Token (NFT) for the user using at least the one or more user credentials as input to the authentication NFT generator algorithm. In addition, the sets of codes are configured for causing computing processing device(s) to verify an authenticity of the authentication NFT through consensus of a plurality of decentralized nodes of a private distributed trust computing network, and store the authentication NFT, in a deactivated state, as a data block within a distributed ledger of the private distributed trust computing network. In response to the user requesting use of the authentication NFT as part of an elevated or multifactor user authentication process, the sets of codes are further configured for causing the computing processor device(s) to receive one or more inputs from the user that are configured to (i) identify a location of the authentication NFT on the first private distributed trust computing network, (ii) check-out the authentication NFT from the first private distributed trust computing network, and (iii) in response to checking out the authentication NFT from first private distributed trust computing network, provide for the authentication NFT to be moved from the deactivated state to an activated state. In response to moving the authentication NFT to the activated state, the sets of codes are configured to cause the computing device processor(s) to attempt to authenticate the user using the one or more user credentials used to generate the authentication NFT.

In specific embodiments of the computer program product, the set of codes for causing the one or more computing processor devices to generate the authentication Non-Fungible Token (NFT) further comprises the set of codes for causing the one or more computing processor devices to generate the authentication NFT in the activated state. In such embodiments of the computer program product, the sets of codes further include a set of codes for causing the one or more computing processor devices to communicate the authentication NFT in the activated state to the user, with the user providing at least one second input that deactivates the authentication NFT and initiates communication to the first private distributed trust communication network.

In other specific embodiments of the computer program product, the deactivated state is an encrypted state and the activated state is an unencrypted or decrypted state.

In still further specific embodiments of the computer program product, the sets of codes further comprise a set of codes for causing the one or more computing processor devices to receive one or more second inputs from the user that are configured to (i) move the authentication NFT from the activated state to the deactivated state, and (ii) check-in the authentication NFT to the first private distributed trust computing network, or, in response to expiration of a predetermined time period, (i) move the authentication NFT from the activated state to the deactivated state, and (ii) check-in the authentication NFT to the first private distributed trust computing network.

Thus, according to embodiments of the invention, which will be discussed in greater detail below, the present invention provides for a highly secure means for user authentication in which an authentication NFT is generated and stored, in a deactivated state, on a distributed ledger of a private distributed trust computing network. Subsequently, when the user checks-out the authentication NFT from the distributed ledger and moves the NFT from the deactivated state to an activated state, the user is able use the authentication credentials wedded to the authentication NFT for purposes of multifactored and/or elevated authentication requirements. Thus, by storing the authentication NFT in a deactivated state and only providing for use of the NFT after it has been moved to an activated state, the present invention provides an additional layer of security to the overall authentication process.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
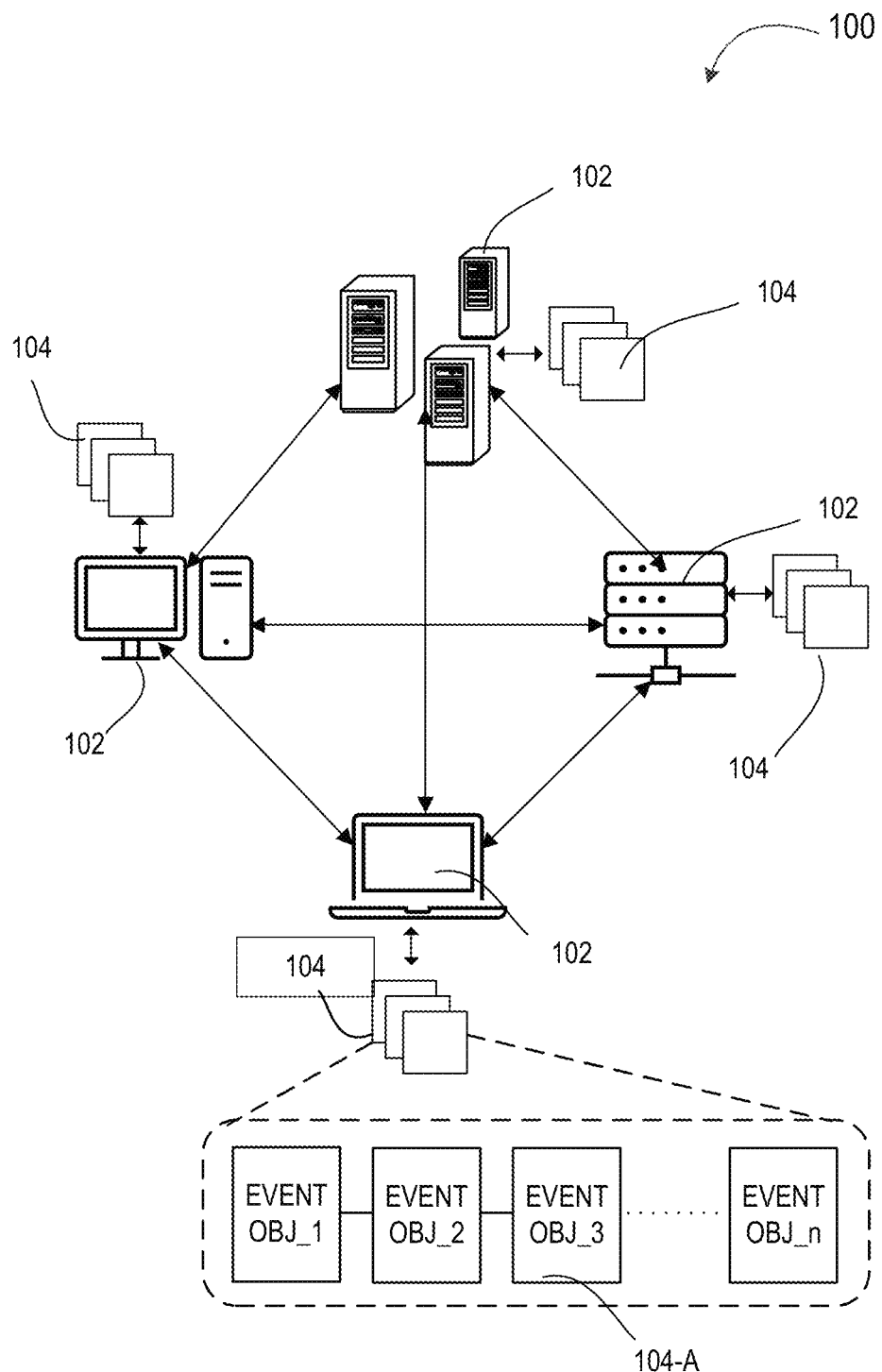
Figure 2:
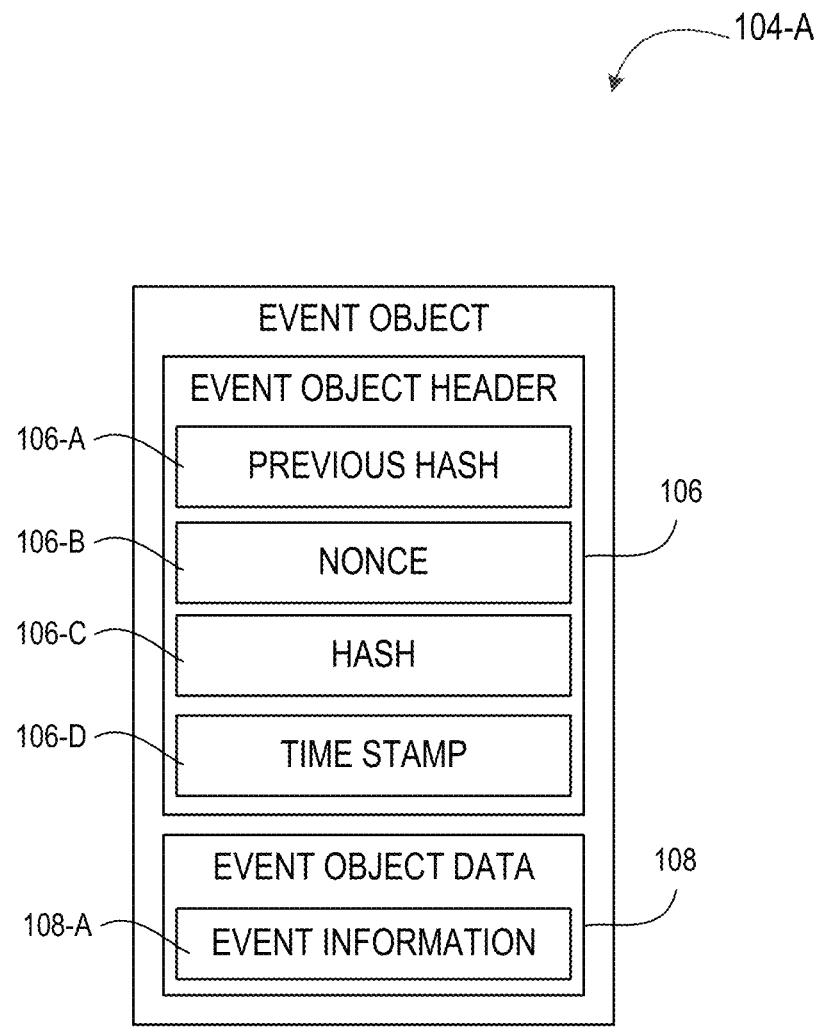
Figure 3:
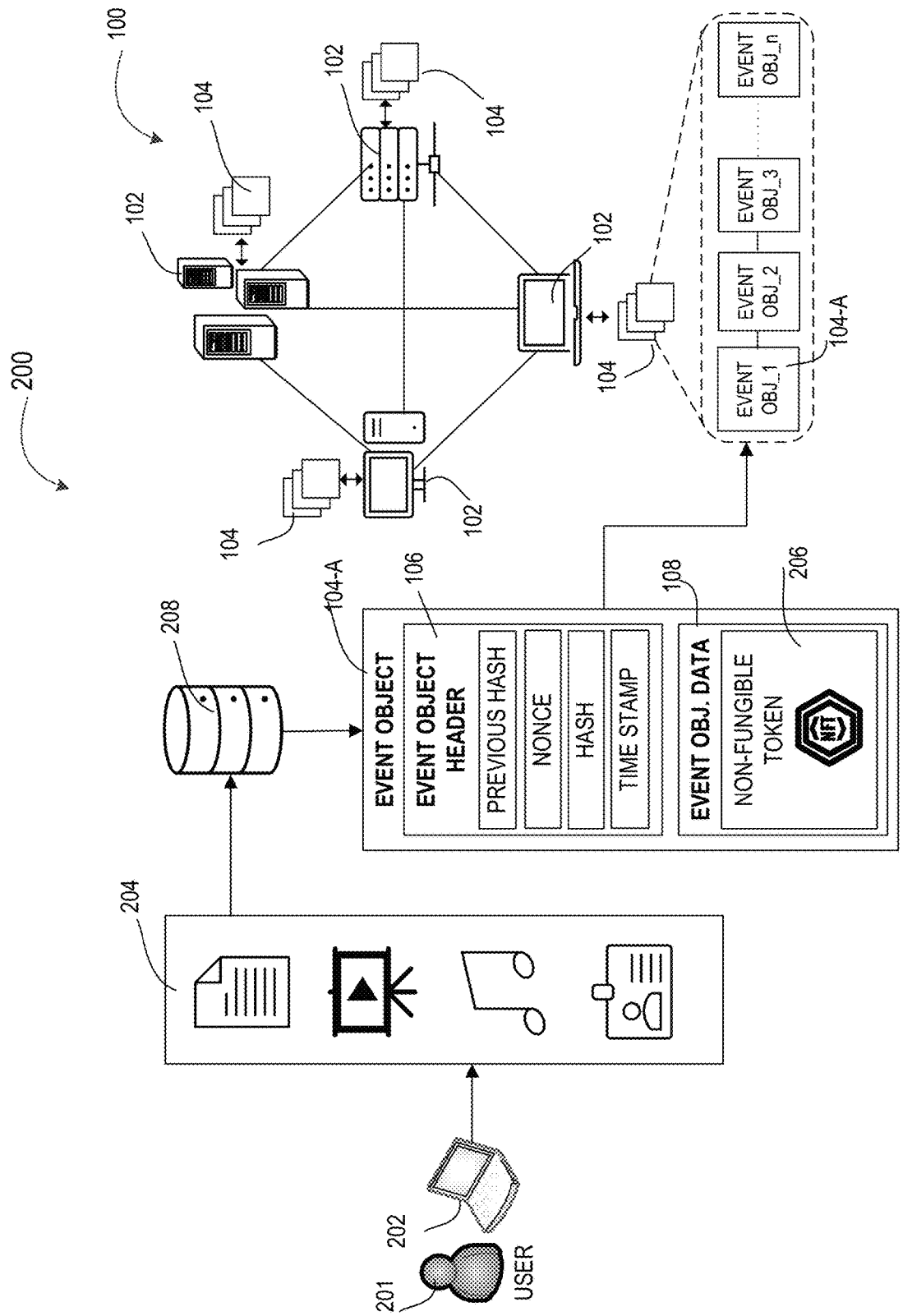
Figure 4:
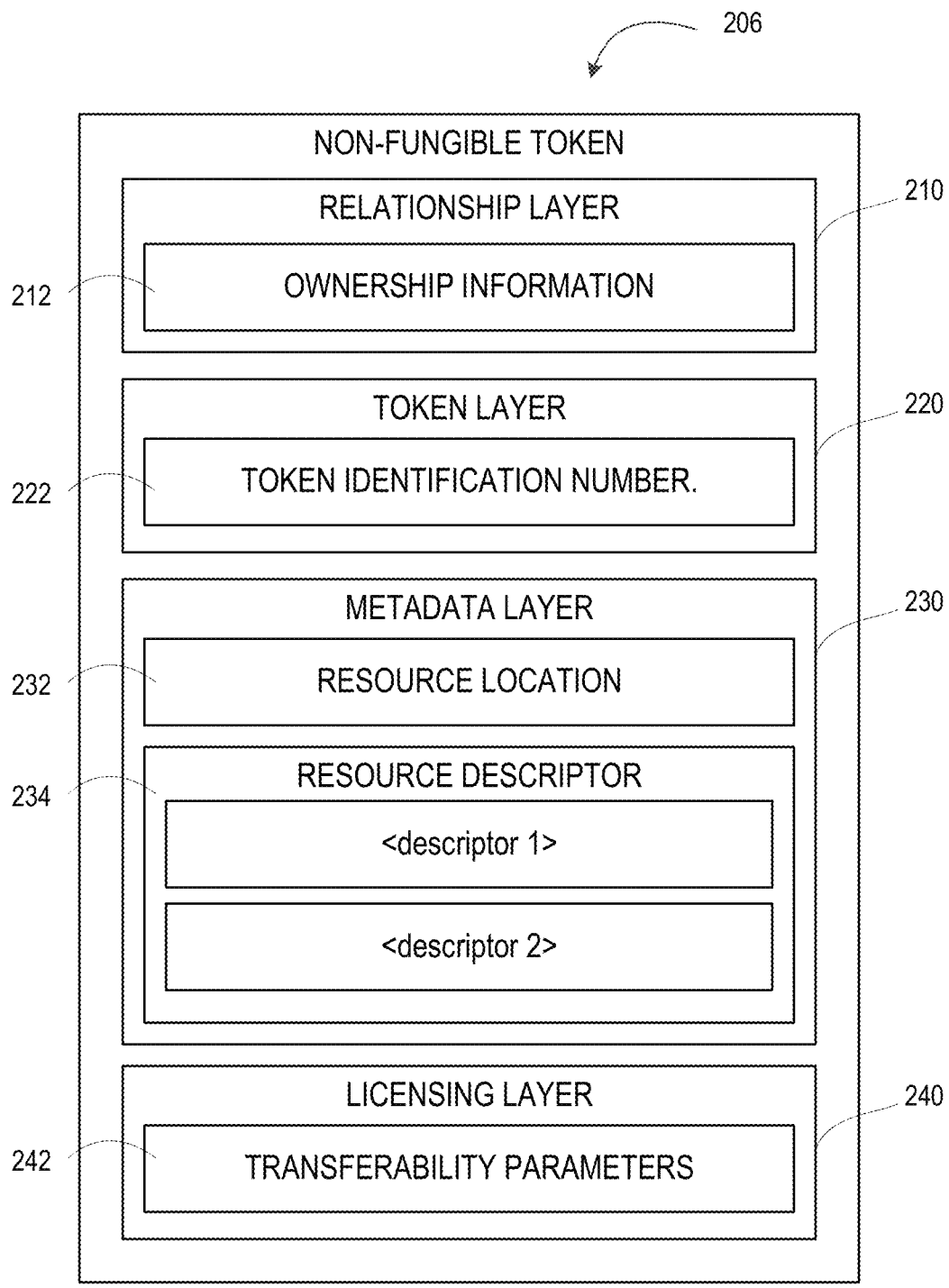
Figure 5:
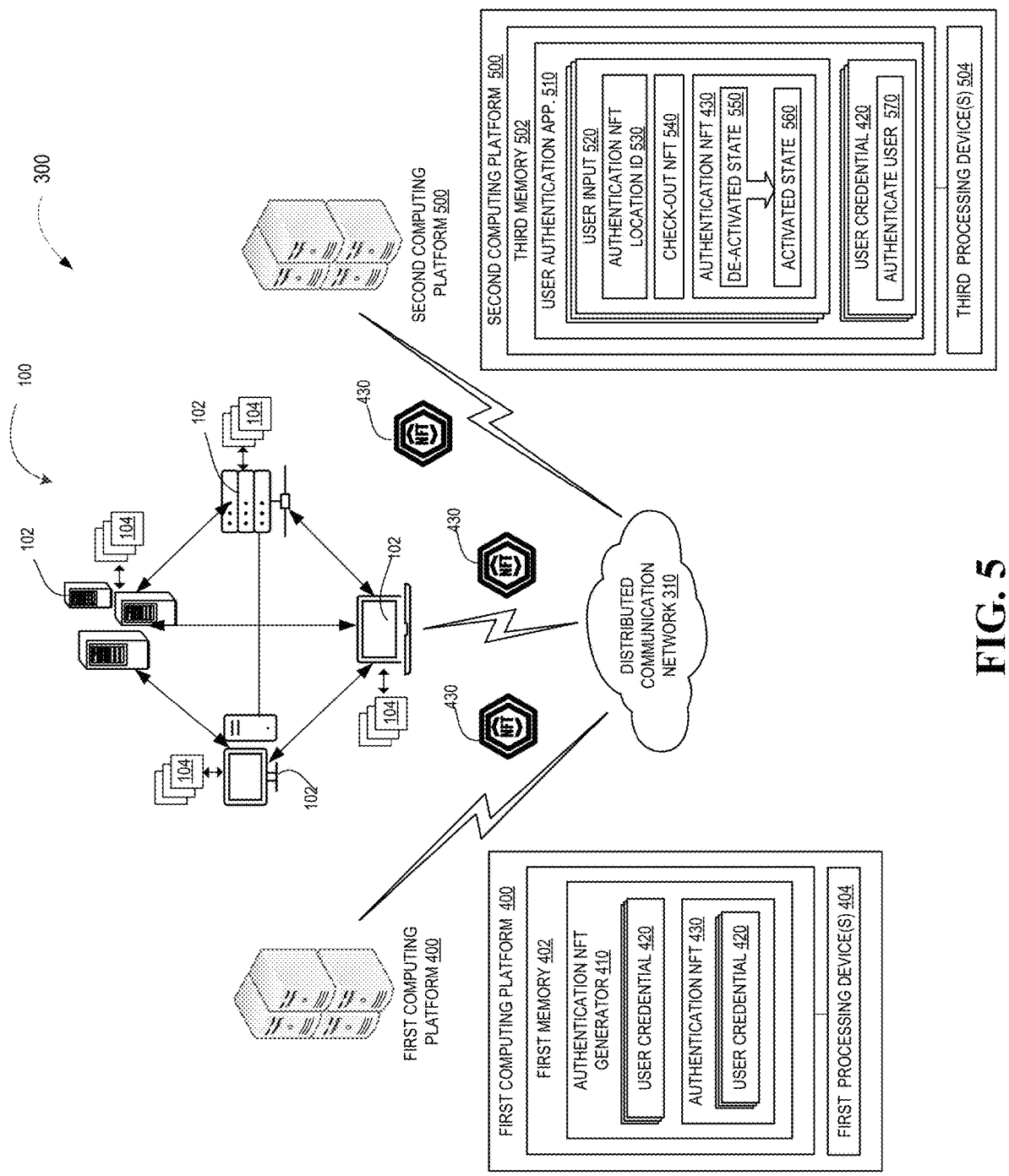
Figure 6:
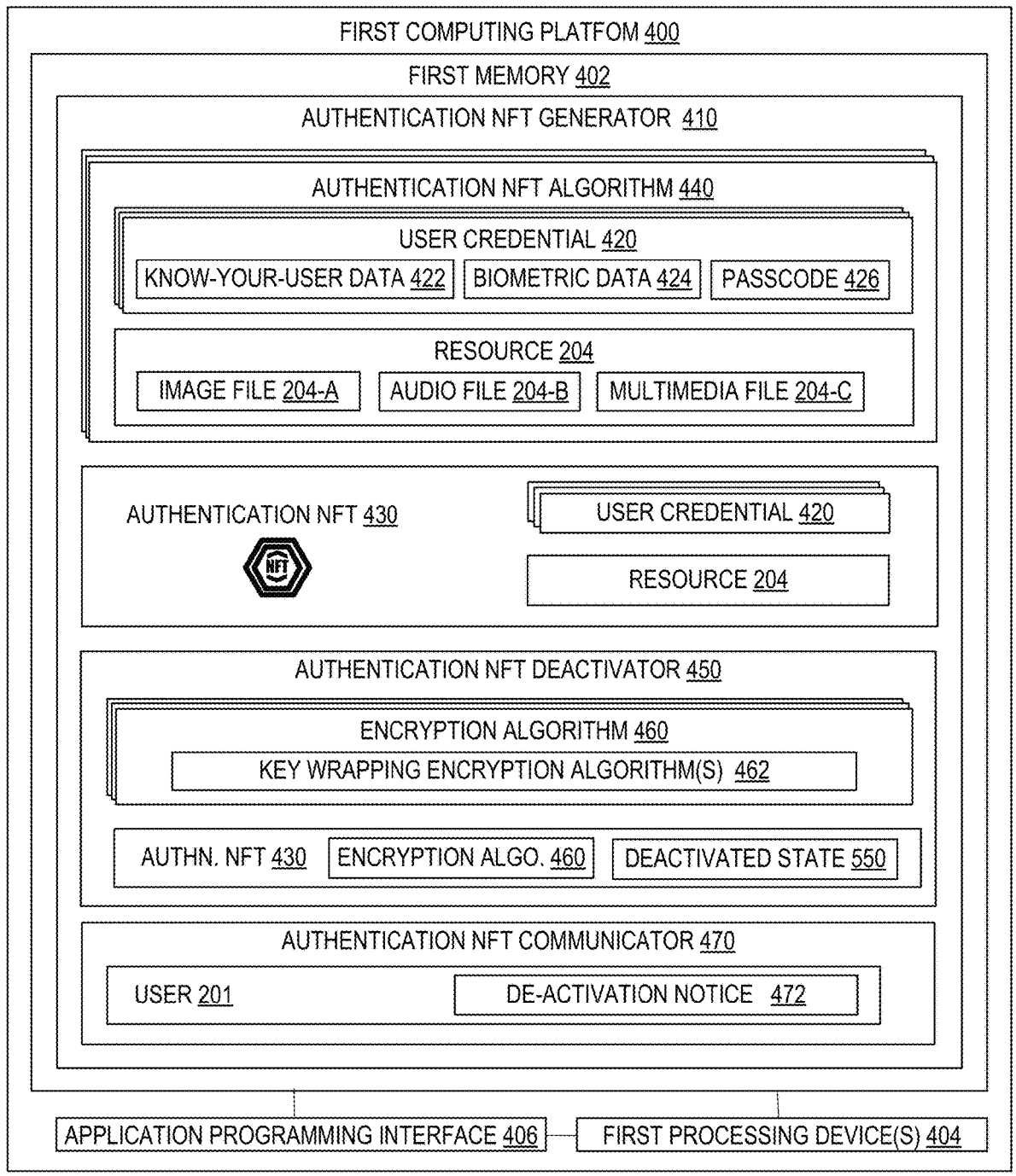
Figure 7:
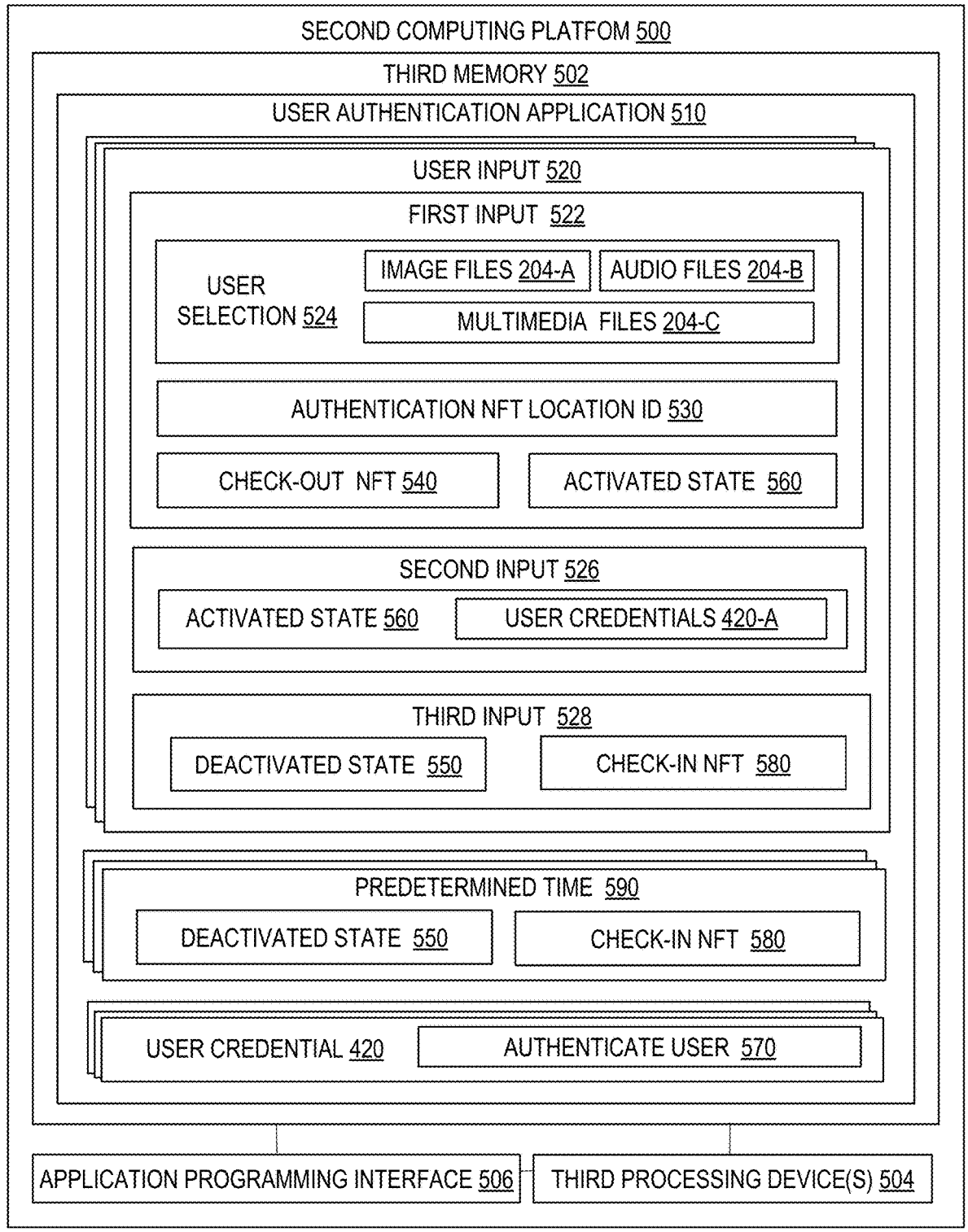
Figure 8:
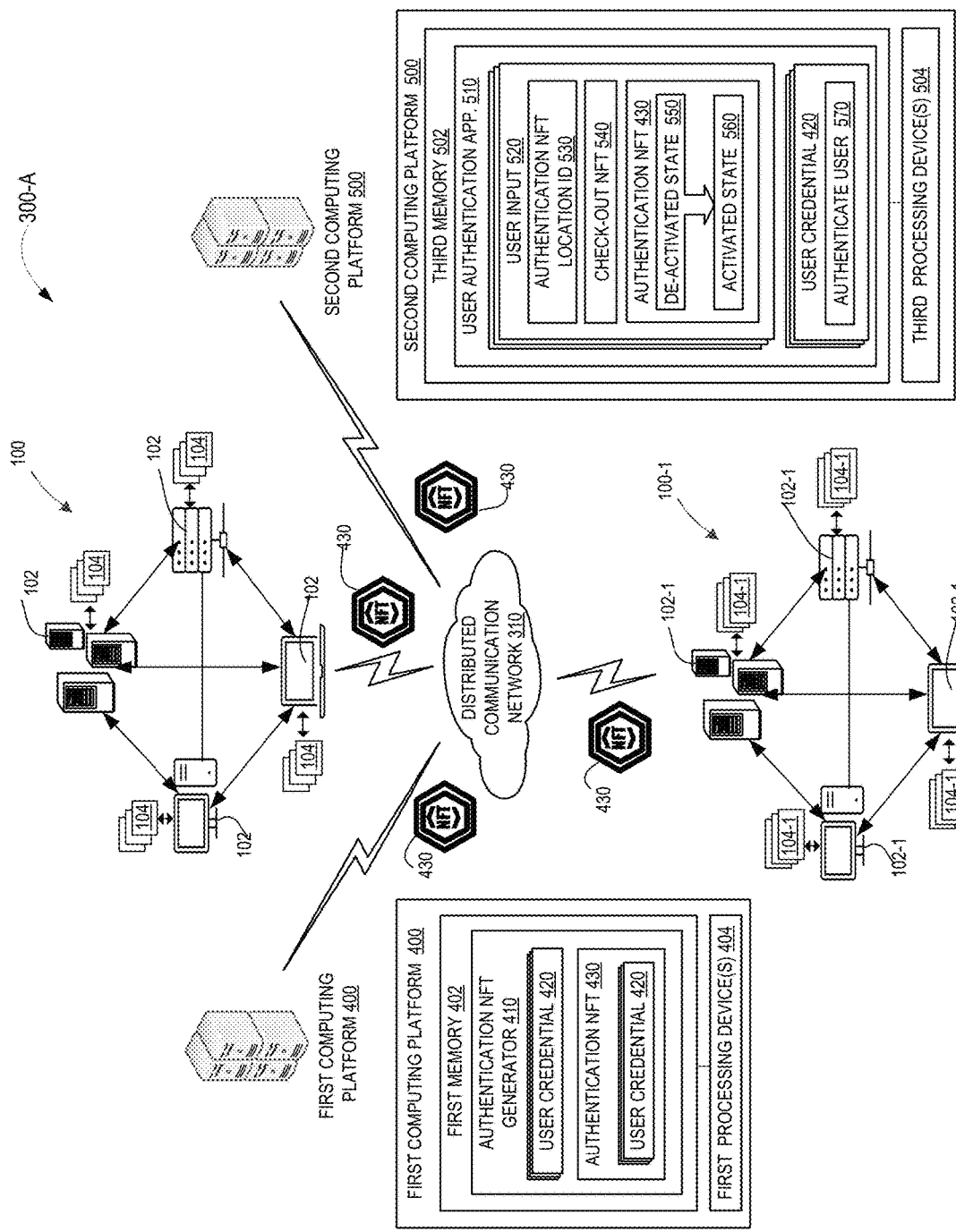
Figure 9:
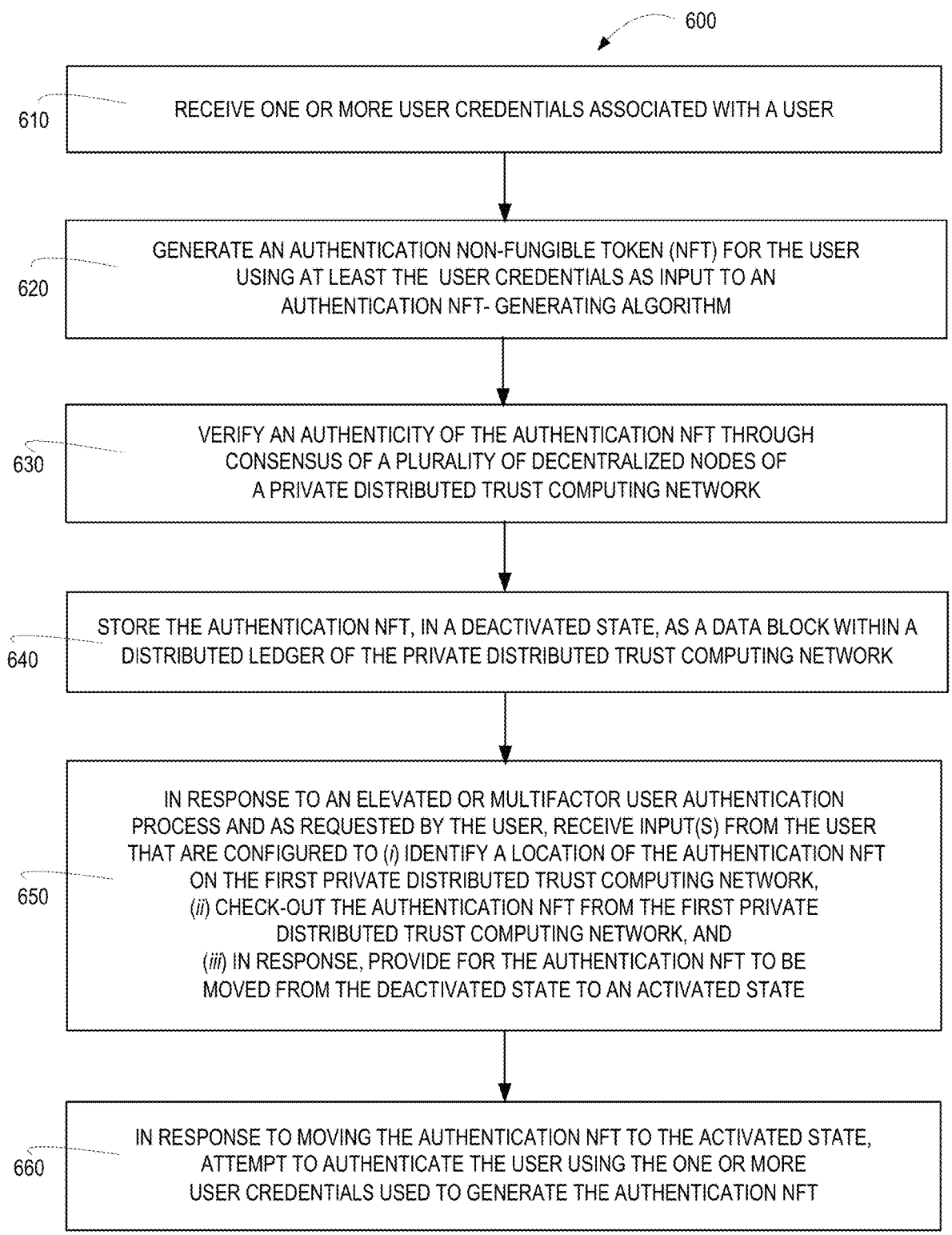

Having thus described embodiments of the disclosure in general terms, reference will now be made to the accompanying drawings, wherein:

FIG. 1 is a schematic diagram of a distributed trust computing network, in accordance with embodiments of the present invention;

FIG. 2 is a block diagram of an event object stored within a distributed ledger of a distributed trust computing network, in accordance with some embodiments of the present disclosure;

FIG. 3 is a schematic diagram of system for generating a Non-Fungible Token (NFT) and storing the NFT within a distributed trust computing network, in accordance with embodiments of the present invention;

FIG. 4 is a block diagram of an architecture for an exemplary NFT; in accordance with embodiments of the present invention;

FIG. 5 is a schematic/block diagram of a system for user authentication implementing an activable authentication NFT, in accordance with embodiments of the present invention;

FIG. 6 is block diagram of a computing platform including an authentication NFT generator, in accordance with embodiments of the present invention;

FIG. 7 is a block diagram a computing platform including a user authentication application that implements an activatable authentication NFT, in accordance with embodiments of the present;

FIG. 8 is a schematic/block diagram of an alternate system for user authentication implementing an activatable authentication NFT, in accordance with embodiments of the present invention;

FIG. 9 is a flow diagram of a method for generating and implanting an activatable authentication NFT for purposes of user authentication, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that leverage secure tokenization, such as a Non-Fungible Token (NFT), for purposes of multifactor and/or elevated user authentication. In this regard, an authentication NFT is generated that uses some form of a user's authentication credentials (e.g., KYU/KYC data, biometric data, and the like) as the seed input for the NFT hash algorithm(s). Subsequently, the authentication NFT is verified/validated via a non-public (i.e., private or proprietary) distributed trust computing network and stored therein on in a distributed ledger in an inactive state. In this regard, the authentication NFT is either generated in the inactive state or presented to the user for deactivation prior to presenting the authentication NFT to the private distributed trust computing network for verification/validation and storage.

Once the user desires to use the authentication NFT for purposes of authentication, the deactivated authentication NFT is checked-out from the corresponding distributed ledger of the private distributed trust network and the authentication NFT must be activated in order to use the associated user credentials for purposes of authentication. In specific embodiments of the invention, activation occurs as a result of the user providing a requisite input, such as presenting a passcode, biometric data or the like. In other embodiments of the invention, activation may occur by automatically by communicating the authentication NFT to a second distributed trust computing network, at which verification of the authentication NFT serves to activate the NFT. Once activated, the user credentials associated with the authentication NFT are only valid as long as the authentication NFT is in the activated state.

In specific embodiments of the invention, activation may include, but is not limited to, decrypting an encryption applied over the top of the authentication NFT (e.g., a key wrapping procedure or the like). The activation period may be time restricted, in that, the authentication NFT may be automatically deactivated and checked back into the corresponding distributed ledger of the private distributed trust network after expiration of a predetermined time period or, in other embodiments of the invention, the user may be tasked with deactivated and checked back into the corresponding distributed ledger of the private distributed trust network.

Turning now to the figures, FIGS. 1 and 2 illustrate an exemplary distributed ledger technology (DLT) architecture implemented in a distributed trust computing network (commonly referred to as a "blockchain" network), in accordance with an embodiment of the invention. DLT may refer to the protocols and supporting infrastructure that allow computing devices (peers) in different locations to propose and validate events and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of events represented as event objects that are linked. As event objects each include information about the event object previous to it, they are linked with each additional event object, reinforcing the previously ones stored prior. Therefore, distributed ledgers are resistant to modification of their data because once recorded, the data in any given event object cannot be altered retroactively without altering all subsequent event objects.

To permit events and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or may complement a traditional text-based contract and execute certain provisions, such as conducting an event between Party A to Party B. The computer code of the smart contract itself is replicated across multiple nodes (peers) and, therefore, benefits from the security, permanence, and immutability that a distributed ledger offers. That replication also means that as each new event object is added to the distributed ledger, the code is, in effect, executed. If the parties have indicated, by initiating an event, that certain parameters have been met, the code will execute the step triggered by those parameters. If no such event has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general-purpose deployment of decentralized applications. A distributed ledger may be characterized as a public distributed ledger, a consortium distributed ledger, or as is the case in the present invention, a private (i.e., non-public and/or proprietary) distributed ledger. A public distributed ledger is a distributed ledger that any entity can access, communicate events to and expect to see them stored thereon if they nodes of the distributed trust computing network come to a consensus and find the events to be valid. Further, any entity can participate in the consensus process for determining which event objects are valid and, therefore, are added to the distributed ledger and determination of the current state of each event object. A public distributed ledger is generally considered to be fully decentralized. On the other hand, a fully private distributed ledger is a distributed ledger in which permissions are kept centralized with one entity (i.e., the entity that controls/owns the private distributed trust computing network and the private distributed ledgers stored thereon). The permissions may be public or restricted to an arbitrary extent. And lastly, a consortium distributed ledger is a distributed ledger where the consensus process is controlled by a pre-selected set of nodes; for example, a distributed ledger may be associated with a specified number of member institutions, each of which operate in such a way that a quorum of the members must sign every event object in order for the event object to be valid. The right to access such a distributed ledger may be public or restricted to the participants. Consortium distributed ledgers may be considered partially decentralized.

As shown in FIG. 1, an exemplary distributed trust computing network 100 includes a distributed ledger 104 being maintained on multiple devices (nodes) 102 that are authorized to keep track of the distributed ledger 104. For example, the nodes 102 may be one or more computing devices such as a comprehensive computing system and one or more client device(s). Each node 102 in the distributed trust computing network 100 may have a complete or partial copy of the entire distributed ledger 104 or set of events and/or event objects 104-A on the distributed ledger 104. Events are initiated at a node and communicated to the various nodes in the distributed trust computing network 100. Any of the nodes 102 can validate an event, record the event to its copy of the distributed ledger 104, and/or broadcast the event, the validation of the event (in the form of an event object) and/or other data to other nodes 102.

As shown in FIG. 2, an exemplary event object 104-A includes an event header 106 and an event object data 108. The event header 106 may include a cryptographic hash of the previous event object 106-A; a nonce 106-B, i.e., a randomly generated 32-bit whole number; a cryptographic hash of the current event object 106-C wedded to the nonce 106-B; and a time stamp 106-D. The event object data 108 may include event information 108-A being recorded. Once the event object 104-A is generated, the event information 108-A is considered signed and forever tied to its nonce 106-B and hash 106-C. Once generated, the event object 104-A is then deployed on the distributed ledger 104. At this time, a distributed ledger address is generated for the event object 104-A, i.e., an indication of where the event object is located on the distributed ledger 104 and captured for recording purposes. Once deployed, the event information 108-A is considered recorded in the distributed ledger 104.

FIG. 3 illustrates an exemplary process of generating a Non-Fungible Token NFT 200, in accordance with an embodiment of the invention. One of ordinary skill in the art will readily appreciate that an NFT is a cryptographic record (referred to as a "token") that is linked to resources, such as digital objects or the like. An NFT is typically stored on a distributed ledger 104 of a distributed trust computing network 100. The storage of the NFT on the distributed ledger 104 means that various nodes 102 of the distributed trust computing network 100 have reached a consensus as to the ownership and validity/authenticity of the NFT, i.e., the linked data.

As shown in FIG. 3, to generate, otherwise referred to as "minting" an NFT, a user (e.g., NFT owner) may identify, using a user input device 202, resources 204 that the user wishes to mint as an NFT. Typically, the resources 204 used to generate the NFTs are digital objects that represent both tangible and intangible objects. These resources 204 may include a piece of art, music, collectible, virtual world items, videos, real-world items such as artwork and real estate, or any other presumed valuable object. These resources 204 are then digitized into a proper format to generate the NFT 206. The NFT 206 may be a multi-layered documentation that identifies the resources 204 but also evidences various event conditions associated therewith.

To record the NFT 206 in a distributed ledger 104, an event object 104-A for the NFT 206 is created using data stored in database 208. As previously discussed in relation to FIG. 2, the event object 104-A includes an event object header 106 and an event object data 108. The event object header 106 includes a cryptographic hash of the previous event object, a nonce (i.e., a random 32-bit whole number generated when the event object is created), a cryptographic hash of the current event object wedded to the nonce, and a time stamp. The event object data 108 includes the NFT 206 being recorded. Once the event object 104-A is generated, the NFT 206 is considered signed and persistently tied to its corresponding nonce and hash. The event object 104-A is then deployed in the distributed ledger 104. At this time, a distributed ledger address is generated for the event object 104-A, i.e., an indication of where the NFT 206 is located on the distributed ledger 104 and captured for recording purposes. Once deployed, the NFT 206 is linked permanently to the corresponding hash and the distributed ledger 104, and is considered recorded in the distributed ledger 104, thus concluding the generation/minting process.

As shown in FIG. 3 and previously discussed in relation to FIG. 1, the distributed ledger 104 may be maintained on multiple devices (nodes) 102 of the distributed trust computing network 100; the multiple nodes 102 are authorized to keep track of the distributed ledger 104. For example, the multiple nodes 104 may be computing devices such as a computing system or end-point device(s). Each node 102 may have a complete or partial copy of the entire distributed ledger 104 or set of events and/or event objects on the distributed ledger 104. Events, such as the creation and recordation of a NFT 206, are initiated at a node 102 and communicated to the various nodes 102. Any of the nodes 102 can validate an event, record the event to the corresponding copy of the distributed ledger 104, and/or broadcast the event, its validation (in the form of an event object 104-A) and/or other data to other nodes 102.

FIG. 4 illustrates an exemplary NFT 206 as a multi-layered documentation of a resource 204, in accordance with an embodiment of an invention. As shown in FIG. 4, the NFT 206 may include at least relationship layer 210, a token layer 220, a metadata layer 230, and, when applicable, a licensing layer 240. The relationship layer 210 may include ownership information 212, including a map of various users that are associated with the resource and/or the NFT 206, and their relationship to one another. For example, if the NFT 206 is purchased by buyer B1 from a seller S1, the relationship between B1 and S1 as a buyer-seller is recorded in the relationship layer 210. In another example, if the NFT 206 is owned by O1 and the resource itself is stored in a storage facility by storage provider SP1, then the relationship between O1 and SP1 as owner-file storage provider is recorded in the relationship layer 210. The token layer 220 may include a token identification number 222 that is used to identify the NFT 206. The metadata layer 230 may include at least a file location 232 and a file descriptor 234. The file location 232 provides information associated with the specific location of the resource 204. Depending on the conditions listed in the smart contract underlying the distributed ledger 104, the resource 204 may be stored on-chain, i.e., directly on the distributed ledger 104 along with the NFT 206, or off-chain, i.e., in an external storage location. The file location 232 identifies where the resource 204 is stored. The file descriptor 234 includes specific information associated with the source itself. For example, the file descriptor 234 may include information about the supply, authenticity, lineage, provenance of the resource 204. The licensing layer 240 may include any transferability parameters 242 associated with the NFT 206, such as restrictions and licensing rules associated with purchase, sale, and any other types of transfer of the resource 204 and/or the NFT 206 from one person to another. Those skilled in the art will appreciate that various additional layers and combinations of layers can be configured as needed without departing from the scope and spirit of the invention.

Referring to FIG. 5, a schematic/block diagram is provided of a system 300 for generating, storing and implementing an authentication Non-Fungible Token (NFT) for purposes of user authentication, in accordance with embodiments of the present invention. The system 300 includes a first computing platform 400 having a first memory 402 and one or more first processing devices 404 in communication with the first memory 402. First memory 402 stores authentication NFT generator 410 that is executable by one or more of the first processing devices 404. Authentication NFT generator 410 is configured to receive one or more user credentials 420, such as passcodes, Know-Your-User data, biometric data or the like, associated with a user and generate an authentication NFT 430 for the user using at least one of the one or more user credentials as the input to the authentication NFT generator 410 (i.e., an input to the one or more hash algorithms used to generate the authentication NFT 430). In accordance with embodiments of the present invention, the authentication NFT 430 is either generated in the activated state or the deactivated state. In the activated state, a user can use the authentication credentials 420 of the authentication NFT 430 for purposes of authentication. Conversely, in the deactivated state the authentication NFT 430 is deemed to "locked" can not be used for purposes of authentication. In those embodiments in which the authentication NFT 430 is generated in the activated state, the authentication NFT 430 must undergo deactivation prior to communicating the authentication NFT 430 to the distributed trust computing network 100.

System 300 additionally includes a first private distributed trust computing network 100 that includes a plurality of first decentralized nodes 102. Each decentralized node 102 having a second memory (not shown in FIG. 5) and at least one second processing device (not shown in FIG. 5) that is in communication with the second memory. The second memory is configured to store one or more distributed ledgers 104 with each distributed ledger 104 comprising a plurality of linked first data blocks associated with event objects 104-A (shown on FIG. 2). In accordance with embodiments of the system 300, in response to receiving an authentication NFT 430, a plurality of the decentralized nodes 102 are configured to verify authenticity of the authentication NFT. Subsequently, the authentication NFT 430 is stored, in a deactivated state, as a first data block within one of the first distributed ledgers 104.

In addition, system 300 includes second computing platform 500 having a third memory 502 and one or more third processing devices 504 in communication with the third memory 502. Third memory 502 stores user authentication application 510 that is executable by one or more of the third processing devices 504. User authentication application 510 may be a standalone user authentication used exclusively for authenticating a user using the authentication NFT 430 or the user authentication application 510 may any other application suitable for and/or requiring user authentication. In this regard, the user authentication application 510 may, in specific embodiments of the invention, be a pre-existing application that is revised to accommodate authentication NFT 430 use or a user authentication application 510 generated to for purposes of authentication NFT 430 use. As part of an elevated and/or multifactor user authentication process and initiated by the user, user authentication application 510 is configured to receive one or more first user inputs 520 that are configured to (i) identify 530 a location of the authentication NFT 430 on the first private distributed trust computing network 100, (ii) check-out 540 the authentication NFT 430 from the first private distributed trust computing network, and (iii) in response to checking-out 540 the authentication NFT 430 from the first private distributed trust computing network 100, provide for the authentication NFT 430 to be moved from the deactivated state 560 to an activated state 560. An elevated and/or multifactor user authentication process means that the user would have already provided initial user credentials or that conventional user credentials will not suffice for the purposes of authenticating the user. In accordance with embodiments of the invention, the user must initiate the use of the authentication NFT 430 (i.e., the authentication NFT is requested by another user or authentication mechanism).

In response to moving the authentication NFT 430 to the activated state 560, the authentication application 510 is configured to apply one or more of the user credentials 420 to authenticate 570 the user.

Referring to FIG. 6, a block diagram is presented of first computing platform 400 configured generating an authentication NFT, in accordance with embodiments of the present invention. In addition to providing greater details of the first computing platform 400, FIG. 6 highlights various alternate embodiments of the invention. The first computing platform 400 may comprise one or multiple devices, such as servers or the like that are in wired and/or wireless communication with one another. In specific embodiments of the invention, in which the authentication NFT 430 is generated within the distributed trust computing network 100, first computing platform 400 may comprise one or more of the decentralized nodes 102 of the distributed trust computing network 100 (shown in FIG. 5). First computing platform 400 includes first memory 402, which may comprise volatile and non-volatile memory, such as read-only and/or random-access memory (RAM and ROM), EPROM, EEPROM, flash cards, or any memory common to computing platforms). Moreover, first memory 402 may comprise cloud storage, such as provided by a cloud storage service and/or a cloud connection service.

Further, first computing platform 400 also includes one or more first processing devices 404, which may be an application-specific integrated circuit ("ASIC"), or other chipset, logic circuit, or other data processing device. First processing device(s) 404 may execute one or more application programming interface (APIs) 406 that interface with any resident programs, such as authentication NFT generator 410 or the like, stored in first memory 402 of first computing platform 400 and any external programs. First processing devices(s) 404 may include various processing subsystems (not shown in FIG. 6) embodied in hardware, firmware, software, and combinations thereof, that enable the functionality of first computing platform 400 and the operability of first computing platform 400 on a network, such as the Intranet, cellular network(s) and the like. For example, processing subsystems allow for initiating and maintaining communications and exchanging data with other networked devices. For the disclosed aspects, processing subsystems of first computing platform 400 may include any subsystem used in conjunction with authentication NFT generator 410 and related tools, routines, sub-routines, algorithms, sub-algorithms, sub-modules thereof.

In specific embodiments of the present invention, first computing platform 400 may additionally include a communications module (not shown in FIG. 6) embodied in hardware, firmware, software, and combinations thereof, that enables electronic communications between the first computing platform 400 and other networks and network devices, such as first distributed trust computing network 100, second computing platform 500 and the like. Thus, communication module may include the requisite hardware, firmware, software and/or combinations thereof for establishing and maintaining a network communication connection with one or more devices and/or networks.

First memory 402 of first computing platform 400 stores authentication NFT generator 410 that is executable by one or more of the first processing devices 404. Authentication NFT generator 410 includes one or more authentication NFT algorithms 440 that are configured to generate the authentication NFT 430. Specifically, as previously discussed in relation to FIG. 5, authentication NFT generator 410 is configured to receive user credentials 420, such as KYU/KYC data 422 (otherwise referred to as out-of-wallet data), biometric data 424, passcodes 426 and the like. In additional embodiments of the invention, authentication NFT generator 410 is configured to receive conventional resources 204 such as an image file 204-A, an audio file 204-B, or multimedia file 204-C. Authentication NFT generator 410 is further configured to generate an authentication NFT 430 for the user using at least one of the one or more user credentials 420, and, in some embodiments of the invention, resources 204 as the input to the authentication NFT algorithm(s) 440.

In accordance with embodiments of the present invention, the authentication NFT 430 is either generated in the activated state or the deactivated state. In specific embodiments of the invention, in which the authentication NFT 430 is encrypted when in the deactivated state 560, authentication NFT generator 410 or some ancillary application/module includes authentication NFT deactivator 450. Authentication NFT deactivator 450 includes one or more encryption algorithms 460, such as key wrapping algorithm(s) 462 or the like that are configured to automatically, upon authentication NFT 430 generation, apply the encryption algorithm(s) 460 to the authentication NFT 430 to place the authentication NFT 430 in a deactivated state 560.

In alternate embodiments of the invention, in which the authentication NFT generator 410 generates the authentication NFT 430 in an activated state 560, e.g., un-encrypted or the like, authentication NFT generator 410 further includes an authentication NFT communicator 470 that is configured to communicate a de-activation notice 472 to the user, which requires that the user de-activate the authentication NFT 430 prior to storing the authentication NFT 430 on a distributed ledger 104 within the first private distributed trust computing network 100. In specific embodiments of the invention, in which the de-activated state 560 provides for the authentication NFT 430 to be encrypted, the user activates authentication NFT deactivator 450 for purposes of applying one or more encryption algorithms 460 to the authentication NFT 430 to encrypt the authentication NFT 430.

It should be noted that in those embodiments of the invention in which the authentication NFT 430 is in the deactivated state 560 when encrypted, one or more of the decentralized nodes 102 of the first private distributed trust computing network 100 may store or have access to the key(s) or other means for decrypting/encrypting the authentication NFT 430. For example, the authentication NFT 430 may require decryption in order to perform the validation/authentication process and, once validated/authenticated, may require encryption prior to creating a data block/event object 104-A (shown in FIG. 2) within a corresponding distributed ledger 104.

In still further embodiments of the invention, the authentication NFT 430 is received by the first private distributed trust computing network 100 in an activated state 560 and, after successful validation/authentication by a consensus of the decentralized notes 102, one or more of the decentralized nodes 102 is configured to de-activate 560 the authentication NFT 430 by encryption (i.e., applying one or more encryption algorithms 460 to the authentication NFT 430), prior to creating a data block/event object 104-A (shown in FIG. 2) within a corresponding distributed ledger 104.

Referring to FIG. 7, a block diagram is presented of second computing platform 500 configured authenticating a user using an authentication NFT, in accordance with embodiments of the present invention. In addition to providing greater details of the second computing platform 500, FIG. 7 highlights various alternate embodiments of the invention. Second computing platform 500 may comprise one or multiple devices, such as mobile device(s), personal computing device(s) or the like or the like that are in wired and/or wireless communication with one another. Second computing platform 500 includes third memory 502, which may comprise volatile and non-volatile memory, such as read-only and/or random-access memory (RAM and ROM), EPROM, EEPROM, flash cards, or any memory common to computing platforms). Moreover, third memory 502 may comprise cloud storage, such as provided by a cloud storage service and/or a cloud connection service.

Further, second computing platform 500 also includes one or more third processing devices 504, which may be an application-specific integrated circuit ("ASIC"), or other chipset, logic circuit, or other data processing device. Third processing device(s) 504 may execute one or more application programming interface (APIs) 506 that interface with any resident programs, such as user authentication application 510 or the like, stored in third memory 502 of second computing platform 500 and any external programs. Third processing devices(s) 504 may include various processing subsystems (not shown in FIG. 7) embodied in hardware, firmware, software, and combinations thereof, that enable the functionality of second computing platform 500 and the operability of second computing platform 500 on a network, such as the Intranet, cellular network(s) and the like. For example, processing subsystems allow for initiating and maintaining communications and exchanging data with other networked devices. For the disclosed aspects, processing subsystems of second computing platform 500 may include any subsystem used in conjunction with user authentication application 510 and related tools, routines, subroutines, algorithms, sub-algorithms, sub-modules thereof.

In specific embodiments of the present invention, second computing platform 500 may additionally include a communications module (not shown in FIG. 7) embodied in hardware, firmware, software, and combinations thereof, that enables electronic communications between the second computing platform 500 and other networks and network devices, such as first private distributed trust computing network 100, first computing platform 400 and the like. Thus, communication module may include the requisite hardware, firmware, software and/or combinations thereof for establishing and maintaining a network communication connection with one or more devices and/or networks.

Third memory 502 of second computing platform 500 stores user authentication application 510. As previously discussed, user authentication application 510 may be a standalone application specifically used for NFT authentication or user authentication application 510 may be incorporated within another application (i.e., a sub-component) that requires multifactored authentication; one factor being NFT authentication. In this regard, the multifactored and/or elevated authentication may include, but is not limited to, (i) a user identification and/or password reset to a device or account, (ii) a new account request or new device setup, (iii) a resource exchange event (e.g., payment transaction) that exceeds a predetermined resource exchange amount (e.g., payment amount), (iv) detection of suspicious activity surrounding a resource exchange event (e.g., payment transaction), (v) a request for a new or refresh of an existing Virtual Private Network (VPN) certificate, and (vi) a request for access, typically temporary, to privileged data or privileged functionality within an application or service. In specific embodiments of the invention, the user must initiate authentication using the authentication NFT (in other words, entities other than the user can not require or request that the user authenticate via the authentication NFT).

In response to encountering such multifactored and/or elevated authentication process, a user will activate user authentication application 510 and provide one or more user inputs 520 that are configured to (i) identify a location 530 of the authentication NFT 430 on a distributed ledger 104 of the first private distributed trust computing network 100, (ii) check-out 540 the authentication NFT 430 from the first private distributed trust computing network 100, and (iii) in response to checking out 540 the authentication NFT 430 from first private distributed trust computing network 100, provide for the authentication NFT 430 to be moved from the deactivated state 560 to an activated state 560.

In specific embodiments of the invention, user inputs 520 include first input 522 that is configured to (i) identify a location 530 of the authentication NFT 430 on a distributed ledger 104 of the first private distributed trust computing network 100, and (ii) check-out 540 the authentication NFT 430 from the first private distributed trust computing network 100. In other embodiments of the invention first input 522 is configured to additionally provide for the authentication NFT to be moved from the deactivated state 560 to an activated state 560 (i.e., activate the authentication NFT). In such embodiments of the invention, a single first input 522 by the user is configured to locate 530 the authentication NFT 430, check-out 540 the authentication NFT 430 from the first private distributed trust computing network 100 and activate the authentication NFT 430.

In specific embodiments of the invention, first input 522 comprises user selection 524 from amongst a plurality of image files 204-A, audio files 204-B or multimedia files 204-C that are visually and/or audibly presented to the user by the authentication application 510. The user selection 524 corresponds to the image file 204-A, audio file 204-B or multimedia file 204-C used as the resource 204 for purposes of creating the authentication NFT 430. The other image files 204-A, audio files 204-B or multimedia files 204 may be slight derivations of the image file 204-A, audio file 204-B or multimedia file 204-C used as the resource 204 for creating the authentication NFT 430, such that, only the user is aware of which presented image file 204-A, audio file 204-B or multimedia file 204-C is to be selected. In this regard, user selection 525 of the correct image file 204-A, audio file 204-B or multimedia file 204-C serves as a user passcode.

It should be noted that, according to specific embodiments of the invention, checking-out 540 the authentication NFT 430 from the first private distributed trust network 100 includes creating a duplicate copy of the authentication NFT 430 that is stored on the distributed ledger 104 of the first private distributed trust network 100. The duplicate copy may be created by one or more of the nodes 102 of the first private distributed trust computing network 100 or a computing device external to the first private distributed trust computing network 100. In those embodiments of the invention in which the deactivated state 560 provides for the authentication NFT 430 to be encrypted (e.g., key wrapped or the like), the duplicate copy of the authentication NFT 430 will also be encrypted (e.g., key wrapped or the like) using the same hash as the original authentication NFT 430 (i.e., the authentication NFT stored on the distributed ledger 104 of the first private distributed trust computing network 100).

In specific embodiments of the invention, user input(s) 520 include a second input 526 that is configured to provide for the authentication NFT to be moved from the deactivated state 560 to the activated state 560. In such embodiments of the invention, the second input may comprise user credentials 420-A, such as, but not limited to, biometric data, passcode data or the like. Thus, in those embodiments that include second input 526, the first input 522 (i) identifies a location 530 of the authentication NFT 430 on a distributed ledger 104 of the first private distributed trust computing network 100, and (ii) checks-out 540 the authentication NFT 430 from the first private distributed trust computing network 100 and the second input 526 (iii) provides for the authentication NFT to be moved from the deactivated state 560 to an activated state 560.

In response to moving the authentication NFT 430 to the activated state 560, the authentication application 510 is configured to apply one or more of the user credentials 420 to authenticate 570 the user. In other words, compare current inputs from the user of biometric data, KYU data and/or other user credentials to the user credentials 420 comprising the authentication NFT 430. If the authentication is successful, the user is granted access to the process requiring authentication or, alternatively, if the authentication is unsuccessful, the user is denied access to the process requiring authentication.

In response to successful authentication, authentication application 510 is configured to receive third input 528 that is configured to move the authentication NFT 430 from the activated state 560 to the deactivated state 560 and check-in 580 to the distributed ledger 104 of the first private distributed trust computing network 100. In those embodiments of the invention, in which the deactivated state comprises an encrypted authentication NFT, moving the authentication NFT 430 from the activated state 560 to the deactivated state 560 may comprises encrypting (e.g., key wrapping) the authentication NFT 430 with the same hash used to originally encrypt the authentication NFT. Checking-in 580 the authentication NFT 430 comprises creating a new data block/event object 104-A within the distributed ledger 104 of the first private distributed trust computing network 100.

Additionally, authentication application 510 may be configured such that lapsed of a predetermined time period 590 triggers automatic movement of the authentication NFT 430 from the activated state 560 to the deactivated state 560 and checking-in 580 to the distributed ledger 104 of the first private distributed trust computing network 100. In this regard, once the authentication NFT 430 is in the activated state 560 and an authentication process is not preformed within the predetermined time period 590, the authentication NFT 430 is automatically moved to the deactivated state 550 (i.e., deactivated) and checked back into the distributed ledger 104 of the first private distributed trust computing network 100

Referring to FIG. 8 a schematic diagram is presented of an alternate system 300-A for generating an authentication NFT 430 and using the authentication NFT for purposes of authentication, in accordance with embodiments of the present invention. Specifically, the system 300-A implements a second private distributed trust computing network 100-A for purposes of activating the authentication NFT 430. Second private distributed trust computing network 100-A includes a plurality of decentralized nodes 102-A, which store at least a portion of one or more distributed ledgers 104-A.

Similar to the system 300 shown and described in relation to FIG. 5, authentication NFT generator 410 of first computing platform 400 generates an authentication NFT 430 using user credentials 420. Subsequently, the authentication NFT 430 is verified and stored, in a deactivated state 550, in a distributed ledger 104 of the first private distributed trust computing network 100. The deactivated state 550 may include in accessible state in which no entity may access the authentication NFT 430 while stored within first private distributed trust computing network 100 and/or encryption of the authentication NFT 430 by the first private distributed trust computing network 100 after validation by the nodes 102 and prior to storage on the distributed ledger 104.

Subsequently, the user authentication application 510, shown and described in relation to FIG. 5, receives a user input 520 that locates 530 the authentication NFT 430 on the distributed ledger 104, checks-out 540 the authentication NFT 430 from the distributed ledger 104 (e.g., creates a duplicate copy of the authentication NFT or the like) and moves the authentication NFT 430 from the deactivated state 550 to the activated state 560. In accordance with embodiments of the present invention, movement to the activated state 560 is realized by verifying and storing, in the activated state 560, the authentication NFT 430 within a distributed ledger 10-4-A of the second private distributed trust computing network 100-A. In specific embodiments of the invention, mere storage of the authentication NFT 430 on the distributed ledger 104-A of the second private distributed trust computing network 100-A places the authentication NFT 430 in the activated state 560, in which the authentication NFT 430 is in an accessible state in which the user may access the user credentials for purposes of authentication. In those embodiments of the invention in which the deactivated state 550 includes encryption, the authentication NFT 430 may be decrypted prior to communicating the authentication NFT 430 to the second private distributed trust computing network 100-A, for subsequent verification and storage purposes. Once the user has completed the authentication process and provided an input or a predetermined period of time lapses, the authentication NFT 430 is checked-out of the distributed ledger 104-A of the second private distributed trust computing network 100-A, moved from the activated state 560 to the deactivated state 550 and checked back into the distributed ledger 104 of the first private distributed trust computing network 100 (i.e., a new data block/event object is stored in the distributed ledger 550 indicating that the authentication NFT 430 has been checked-in).

Referring to FIG. 9, a flow diagram is presented of a method 600 for user authentication, in accordance with embodiments of the present invention. At Event 610, user credentials, such as biometric data, KYU/KYC data, passcodes or the like that is associated with a user is received. In additional embodiments of the method, conventional resources, such as an image file, an audio file or a multimedia file is additionally received.

At Event 620, an authentication NFT is generated for the user using at least the user credentials as the input to the authentication NFT-generating algorithm(s). In alternate embodiments of the invention, in which the conventional resources are received, the conventional resources may also be used as the input to the authentication NFT-generating algorithms. The authentication NFT may be generated in an activated state or in a deactivated state. In those embodiments of the invention in which the authentication NFT is generated in an activated state, the authentication NFT may be deactivated prior to communicating the authentication NFT to private distributed trust communication network (or, in instances in which the authentication NFT is generated within the private distributed trust network, prior to verifying the authentication NFT within the private distributed trust computing network). Such deactivation may require an input from the user.

At Event 630, the authenticity of the authentication NFT is verified via consensus of a plurality of the decentralized nodes of a private distributed trust computing network and, at Event 640, the authentication NFT is stored, in a deactivated state, as a data block/event object within a distributed ledger of the private distributed trust computing network. In specific embodiments of the method, storing the authentication NFT in a deactivated state may include encrypting the authentication NFT, such key wrapping the authentication NFT. In further specific embodiments of the method, the authentication NFT is encrypted by the private distributed trust computing network after verification and prior to storage or, in other embodiments of the invention, the authentication NFT is encrypted prior to communication to the private distributed trust computing network, decrypted prior to verification and re-encrypted prior to storage. In such embodiments of the method, one or more of the decentralized nodes stores or has access to the encryption key. In other embodiments of the invention, mere storage of the authentication NFT in the distributed ledger of the private distributed trust computing network may provide for the deactivated state.

At Event 650, in response to an elevated and/or multi-factor user authentication process and at the bequest of the user, one or more inputs are received from the user that are configured to (i) identify a location of the authentication NFT on the distributed ledger of the private distributed trust computing network, (ii) check-out the authentication NFT from the distributed ledger of the private distributed trust computing network, and (iii) in response to checking out the authentication NFT from the distributed ledger of the private distributed trust computing network, provide for the authentication NFT to be moved from the deactivated state to an activated state. In specific embodiments of the method, a single user input is configured to identify the location of the authentication NFT, check-out the authentication NFT from the distributed ledger, and activate the authentication NFT. In other specific embodiments of the method, a first user input is configured to identify the location of the authentication NFT, check-out the authentication NFT and a second user input is configured to activate the authentication NFT.

In specific embodiments of the method, the number of inputs and the type of data (i.e., user credentials) required to identify the location of the authentication NFT, check-out the authentication NFT from the distributed ledger, and activate the authentication NFT are determined on an individual authentication process basis. In this regard, machine learning techniques may be implemented to determine the number of inputs and/or type of data inputted based on previous uses of the authentication NFT by the user, security concerns associated with the current authentication process and/or how elevated/important is the current authentication process.

In specific embodiments of the method, checking-out the authentication NFT may comprise generating a duplicate copy of the authentication NFT that is currently stored on the distributed ledger.

In other specific embodiments of the method, providing for the authentication mechanism NFT to be moved from the deactivated state to an activated state comprises decrypting a previously encrypted authentication NFT. In other related embodiments of the method, providing for the authentication mechanism NFT to be moved from the deactivated state to an activated state comprises communicating the authentication NFT to another private distributed trust computing network at which the authentication NFT is verifies and stored, in the activated state, in a distributed ledger.

At Event 660, once the authentication NFT has been moved from the deactivated state to the activated state, an attempt to authenticate the user is made using the one or more credentials in the authentication NFT.

In specific embodiments of the method, once the authentication process has ended, the authentication NFT is deactivated and re-checked-in to the private distributed trust computing network. Such, deactivation and re-checking-in may occur by user input or after lapse of a predetermined period of time. In specific embodiments of the method, moving the authentication NFT back to the deactivated state includes re-encrypting (e.g., re-key wrapping or the like) the authentication NFT. While in other related embodiments of the method, moving the authentication NFT back to the deactivated state includes or further includes checking the authentication NFT out from the other private distributed trust computing network (e.g., generating a duplicate copy of the authentication NFT that is stored on the other private distributed trust computing network). In other specific embodiments of the method, re-checking the authentication NFT back into the original private distributed trust computing network, includes verifying the authentication NFT being checked back-in and storing, in the deactivated state, the authentication NFT in a distributed ledger of the original private distributed trust computing network.

Thus, present embodiments of the invention provide for a highly secure means for user authentication in which an authentication NFT is generated and stored, in a deactivated state, on a distributed ledger of a private distributed trust computing network. Subsequently, when the user checks-out the authentication NFT from the distributed ledger and moves the NFT from the deactivated state to an activated state, the user is able use the authentication credentials wedded to the authentication NFT for purposes of multifactored and/or elevated authentication requirements. Thus, by storing the authentication NFT in a deactivated state and only providing for use of the NFT after it has been moved to an activated state, the present invention provides an additional layer of security to the overall authentication process.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A system for user authentication, the system comprising:
a first computing platform including a first memory and one or more first processing devices in communication with the first memory, wherein the first memory stores an authentication Non-Fungible Token (NFT) generator that is executable by at least one of the one or more first processing devices and configured to:
  receive one or more user credentials associated with a user, and
  generate an authentication NFT for the user using at least the one or more user credentials as input to the authentication NFT generator;
a first private distributed trust computing network comprising a plurality of first decentralized nodes, each first decentralized node having a second memory and at least one second processing device in communication with the second memory, wherein the second memory of the first decentralized nodes is configured to store one or more first distributed ledgers, each first distributed ledger comprising a plurality of first data blocks, wherein in response to receiving the authentication NFT, a plurality of the first decentralized nodes are configured to verify authenticity of the authentication NFT, and the authentication NFT is stored, in a deactivated state, as a first data block within one of the one or more first distributed ledgers; and
a second computing platform including a third memory and one or more third processing devices in communication with the third memory, wherein the third memory stores an authentication application that is executable by at least one of the one or more third processing devices and configured to:
  as part of an elevated or multifactor user authentication process and initiated by the user, receive one or more first inputs from the user that are configured to (i) identify a location of the authentication NFT on the first private distributed trust computing network, (ii) check-out the authentication NFT from the first private distributed trust computing network, and (iii) in response to checking out the authentication NFT from first private distributed trust computing network, provide for the authentication NFT to be moved from the deactivated state to an activated state, and
  in response to moving the authentication NFT to the activated state, apply the one or more user credentials to authenticate the user.

2. The system of claim 1, wherein the authentication Non-Fungible Token (NFT) generator is further configured to:
  generate the authentication NFT in the activated state, and
  communicate the authentication NFT in the activated state to the user, wherein the user provides at least one second input that deactivates the authentication NFT and initiates communication to the first private distributed trust communication network.

3. The system of claim 1, wherein the authentication Non-Fungible Token (NFT) generator is further configured to:
  generate the authentication NFT in the deactivated state, and
  communicate the authentication NFT in the deactivated state to the first private distributed trust computing network.

4. The system of claim 1, wherein the deactivated state is an encrypted state and the activated state is an unencrypted or decrypted state.

5. The system of claim 4, wherein the encrypted state provides for key wrapping the authentication NFT.

6. The system of claim 1, further comprising:
  a second private distributed trust computing network comprising a plurality of second decentralized nodes, each second decentralized node having a fourth memory and at least one fourth processing device in communication with the fourth memory, wherein the fourth memory of the second decentralized nodes is configured to store one or more second distributed ledgers, each second distributed ledger comprising a plurality of second data blocks,
  wherein the authentication application is further configured to provide for the authentication NFT to be moved from the deactivated state to the activated state by communicating the authentication NFT to the second private distributed trust computing network, wherein in response to receiving the authentication NFT, a plurality of the second decentralized nodes are configured to verify authenticity of the authentication NFT, and the authentication NFT is stored, in the activated state, as a second data block within one of the one or more second distributed ledgers.

7. The system of claim 1, wherein the authentication application is further configured to receive one or more second inputs from the user that are configured to (i) move the authentication NFT from the activated state to the deactivated state, and (ii) check-in the authentication NFT to the first private distributed trust computing network.

8. The system of claim 1, wherein the authentication application is configured to, in response to expiration of a predetermined time period, (i) move the authentication NFT from the activated state to the deactivated state, and (ii) check-in the authentication NFT to the first private distributed trust computing network.

9. The system of claim 1, wherein the authentication NFT generator is further configured to:
  receive (i) an image file, (ii) an audio file, or (iii) a multimedia file, and
  generate the authentication NFT additionally using (i) the image file, (ii) the audio file, or (iii) the multimedia file as input to the authentication NFT generator.

10. The system of claim 1, wherein the authentication application is further configured to:
  present a plurality of (i) image files, (ii) audio files, or (iii) multimedia files, wherein one of the plurality of (i) image files, (ii) audio files, or (iii) a multimedia files corresponds to (i) the image file, (ii) the audio file, or (iii) the multimedia file used to generate the authentication file,
  wherein user selection of the (i) the image file, (ii) the audio file, or (iii) the multimedia file used to generate the authentication file provides for at least one of the one or more first inputs.

11. The system of claim 1, wherein the elevated or multifactored authentication process comprises one of (i) at least one of a user identification and a password reset, (ii) a new account request, (iii) initiation of a resource exchange event that exceeds a predetermined resource exchange amount, (iv) in response to suspicious activity associated with a resource exchange event, (v) request a new or refresh of an existing Virtual Private Network (VPN) certification, and (vi) temporary access to privileged data or functionality within an application.

12. A computer-implemented method for user authentication, the computer-implemented method is executed by one or more computing processor devices and comprises:
  receiving one or more user credentials associated with a user, and generating an authentication Non-Fungible Token (NFT) for the user using at least the one or more user credentials as input to an authentication NFT generating algorithm;

verifying an authenticity of the authentication NFT through consensus of a plurality of decentralized nodes of a private distributed trust computing network;

storing the authentication NFT, in a deactivated state, as a data block within a distributed ledger of the private distributed trust computing network;

triggered by the user as part of an elevated or multifactor user authentication process, receiving one or more inputs from the user that are configured to (i) identify a location of the authentication NFT on the first private distributed trust computing network, (ii) check-out the authentication NFT from the first private distributed trust computing network, and (iii) in response to checking out the authentication NFT from first private distributed trust computing network, provide for the authentication NFT to be moved from the deactivated state to an activated state; and in response to moving the authentication NFT to the activated state, attempting to authenticate the user using the one or more user credentials used to generate the authentication NFT.

13. The computer-implemented method of claim 12, wherein generating the authentication Non-Fungible Token (NFT) further comprises:

generating the authentication NFT in the activated state, and wherein the computer-implemented method further comprises:

communicating the authentication NFT in the activated state to the user, wherein the user provides at least one second input that deactivates the authentication NFT and initiates communication to the first private distributed trust communication network.

14. The computer-implemented method of claim 12, wherein the deactivated state is an encrypted state and the activated state is an unencrypted or decrypted state.

15. The computer-implemented method of claim 12, wherein receiving one or more inputs from the user that are configured to (iii) in response to checking out the authentication NFT from first private distributed trust computing network, provide for the authentication NFT to be moved from the deactivated state to an activated state further comprises receiving one or more inputs from the user that are configured to provide for the authentication NFT to be moved from the deactivated state to an activated state by communicating the authentication NFT to a second private distributed trust computing network, and storing the authentication NFT, in the activated state, as a second data block within a second distributed ledger of the second private distributed trust computing network.

16. The computer-implemented method of claim 12, further comprising one of:

receiving one or more second inputs from the user that are configured to (i) move the authentication NFT from the activated state to the deactivated state, and (ii) check-in the authentication NFT to the first private distributed trust computing network; or in response to expiration of a predetermined time period, (i) moving the authentication NFT from the activated state to the deactivated state, and (ii) checking the authentication NFT back in to the first private distributed trust computing network.

17. A computer program product comprising:

a non-transitory computer-readable medium comprising sets of codes for causing one or more computing processing devices to:

receive one or more user credentials associated with a user, and generate an authentication Non-Fungible Token (NFT) for the user using at least the one or more user credentials as input to the authentication NFT generator algorithm;

verify an authenticity of the authentication NFT through consensus of a plurality of decentralized nodes of a private distributed trust computing network;

store the authentication NFT, in a deactivated state, as a data block within a distributed ledger of the private distributed trust computing network;

triggered by the user as part of an elevated or multifactor user authentication process, receive one or more inputs from the user that are configured to (i) identify a location of the authentication NFT on the first private distributed trust computing network, (ii) check-out the authentication NFT from the first private distributed trust computing network, and (iii) in response to checking out the authentication NFT from first private distributed trust computing network, provide for the authentication NFT to be moved from the deactivated state to an activated state; and in response to moving the authentication NFT to the activated state, attempt to authenticate the user using the one or more user credentials used to generate the authentication NFT.

18. The computer program product of claim 17, wherein the set of codes for causing the one or more computing processor devices to generate the authentication Non-Fungible Token (NFT) further comprises the set of codes for causing the one or more computing processor devices to generate the authentication NFT in the activated state, and wherein the sets of codes further comprise a set of codes for causing the one or more computing processor devices to communicate the authentication NFT in the activated state to the user, wherein the user provides at least one second input that deactivates the authentication NFT and initiates communication to the first private distributed trust communication network.

19. The computer program product of claim 17, wherein the deactivated state is an encrypted state and the activated state is an unencrypted or decrypted state.

20. The computer program product of claim 17, wherein the sets of codes further comprise a set of codes for causing the one or more computing processor devices to receive one or more second inputs from the user that are configured to (i) move the authentication NFT from the activated state to the deactivated state, and (ii) check-in the authentication NFT to the first private distributed trust computing network, or, in response to expiration of a predetermined time period, (i) move the authentication NFT from the activated state to the deactivated state, and (ii) check-in the authentication NFT to the first private distributed trust computing network.

* * * * *